US012416899B2

(12) United States Patent
Gao et al.

(10) Patent No.: US 12,416,899 B2
(45) Date of Patent: Sep. 16, 2025

(54) OPTICALLY ADDRESSABLE PIXELATED SPATIAL LIGHT MODULATOR AND SPATIAL LIGHT FIELD MODULATION METHOD

(71) Applicants: Huazhong University of Science and Technology, Wuhan (CN); OPTICS VALLEY LABORATORY, Wuhan (CN)

(72) Inventors: Hui Gao, Wuhan (CN); Ke Xu, Wuhan (CN); Wei Xiong, Wuhan (CN); Xuhao Fan, Wuhan (CN); Xinger Wang, Wuhan (CN)

(73) Assignees: Huazhong University of Science and Technology, Wuhan (CN); OPTICS VALLEY LABORATORY, Wuhan (CN)

( * ) Notice: Subject to any disclaimer, the term of this patent is extended or adjusted under 35 U.S.C. 154(b) by 0 days.

(21) Appl. No.: 19/002,669

(22) Filed: Dec. 26, 2024

(65) Prior Publication Data
US 2025/0123592 A1  Apr. 17, 2025

(30) Foreign Application Priority Data
Dec. 29, 2023  (CN) .......................... 2023118477955

(51) Int. Cl.
*G03H 1/22* (2006.01)
(52) U.S. Cl.
CPC ......... *G03H 1/2286* (2013.01); *G03H 1/2202* (2013.01); *G03H 1/2294* (2013.01); *G03H 2222/12* (2013.01); *G03H 2223/24* (2013.01); *G03H 2223/50* (2013.01); *G03H 2225/30* (2013.01)

(58) Field of Classification Search
None
See application file for complete search history.

(56) References Cited

U.S. PATENT DOCUMENTS 7,511,775 B2    3/2009  Harada
9,400,486 B2    7/2016  Lee
2022/0086419 A1*  3/2022  Qaderi ..................... G03H 1/02

FOREIGN PATENT DOCUMENTS

WO    WO-2020165448 A1 *  8/2020  ............. C03C 17/02
WO    WO-2023004463 A1 *  2/2023  ............... G02B 6/12

* cited by examiner

*Primary Examiner* — Jyotsna V Dabbi

(57) ABSTRACT

An optically addressable pixelated spatial light modulator, comprising: a laser light source, a structured light field encoding projection module, and a superpixel metasurface device. The structured light field encoding projection module comprises a structured light field encoding module, which encodes a laser beam emitted by a laser light source into a structured light beam according to the modulation amount distribution of a target light field. The superpixel metasurface device comprises a plurality of unit cell structures, with each unit cell structure serving as a light field modulation pixel point. Each unit cell structure comprises a plurality of sub-wavelength micro-nano structures, and the unit cell structure generates a light field modulation amount under the action of the structured light beam for the light field modulation.

5 Claims, 4 Drawing Sheets

OPTICALLY ADDRESSABLE PIXELATED SPATIAL LIGHT MODULATOR AND SPATIAL LIGHT FIELD MODULATION METHOD

CROSS-REFERENCE TO RELATED APPLICATIONS

This application claims priority to Chinese patent application No. 2023118477955, filed on Dec. 29, 2023, which is hereby incorporated by reference in its entirety.

TECHNICAL FIELD

The present disclosure relates to the field of micro-nano optics, and in particular to an optically addressable pixelated spatial light modulator and spatial light field modulation method.

BACKGROUND

Metasurface devices are a new type of two-dimensional micro-nano optical device with unit structure sizes at the sub-wavelength scale, which is capable of achieving high-resolution and high-flexibility modulation of light fields. However, these devices struggle to achieve dynamic light field modulation. Currently, there are primarily two methods for realizing dynamic metasurfaces: active metasurfaces and multiplexed metasurfaces. Active metasurfaces utilize phase change materials (such as vanadium dioxide or GST, etc.), liquid crystals, stretchable substrates, or chemical reactions to switch modulation effects. Among these, liquid crystal-based metasurface devices can dynamically control modulation effects through circuits, but they can only achieve one-dimensional light field modulation. On the other hand, metasurfaces based on temperature-controlled phase change materials and chemical reactions offer limited capabilities of switching modulation effects and cannot achieve pixel-level modulation. There have been efforts to modify the structure of graphene oxide or phase change materials at a single-pixel scale using femtosecond lasers, but such systems tend to be complex and operate at slower speeds. For multiplexed dynamic metasurfaces, the devices themselves are static and can achieve multiplexed displays or multifunctionality under varying incident light parameters. However, as this approach primarily relies on the design of metasurface structures and front-end incident light encoding for dynamic effects, it is also constrained by physical limitations such as processing technology, making it challenging to realize arbitrary dynamic light field modulation.

SUMMARY

According to an aspect of some embodiments of the present disclosure there is provided an optically addressable pixelated spatial light modulator, including a laser light source, a structured light field encoding projection module, and a superpixel metasurface device.

The structured light field encoding projection module includes a structured light field encoding module, which encodes the laser beam emitted by the laser light source into a structured light beam according to the modulation amount distribution of a target light field.

The superpixel metasurface device includes a plurality of unit cell structures, with each unit cell structure serving as a light field modulation pixel point. Each unit cell structure includes a plurality of sub-wavelength micro-nano structures, and the unit cell structure generates a light field modulation amount under the action of the structured light beam for light field modulation. The light field modulation includes phase modulation and/or amplitude modulation. The sub-wavelength micro-nano structures are isotropic structures or anisotropic structures.

The structured light beam is incident on the superpixel metasurface device, selecting the micro-nano structures in the unit cell corresponding to the modulation amount distribution to achieve the target light field modulation.

According to an aspect of some embodiments of the present disclosure there is provided a spatial light field modulation method, employing the optically addressable pixelated spatial light modulator as described above, including:

Determining the modulation amount distribution required for the target light field modulation;

Encoding the laser beam based on the modulation amount distribution to obtain a corresponding structured light beam;

Directing the corresponding structured light beam into the superpixel metasurface device, selecting the micro-nano structures in the unit cell that correspond to the modulation amount distribution to achieve the target light field modulation.

According to an aspect of some embodiments of the present disclosure there is provided a dynamic holographic video display method, employing the optically addressable pixelated spatial light modulator as described above, including:

Determining the phase modulation amount distribution or the complex amplitude modulation amount distribution for each frame image of a holographic video to be displayed;

Encoding the laser beam based on the phase modulation amount distribution or the complex amplitude modulation amount distribution of each frame image to obtain a corresponding structured light beam;

Directing the corresponding structured light beam into the superpixel metasurface device, selecting the micro-nano structures in the unit cell that correspond to the phase modulation amount distribution or the complex amplitude modulation amount distribution to display each frame image.

Figure 6:
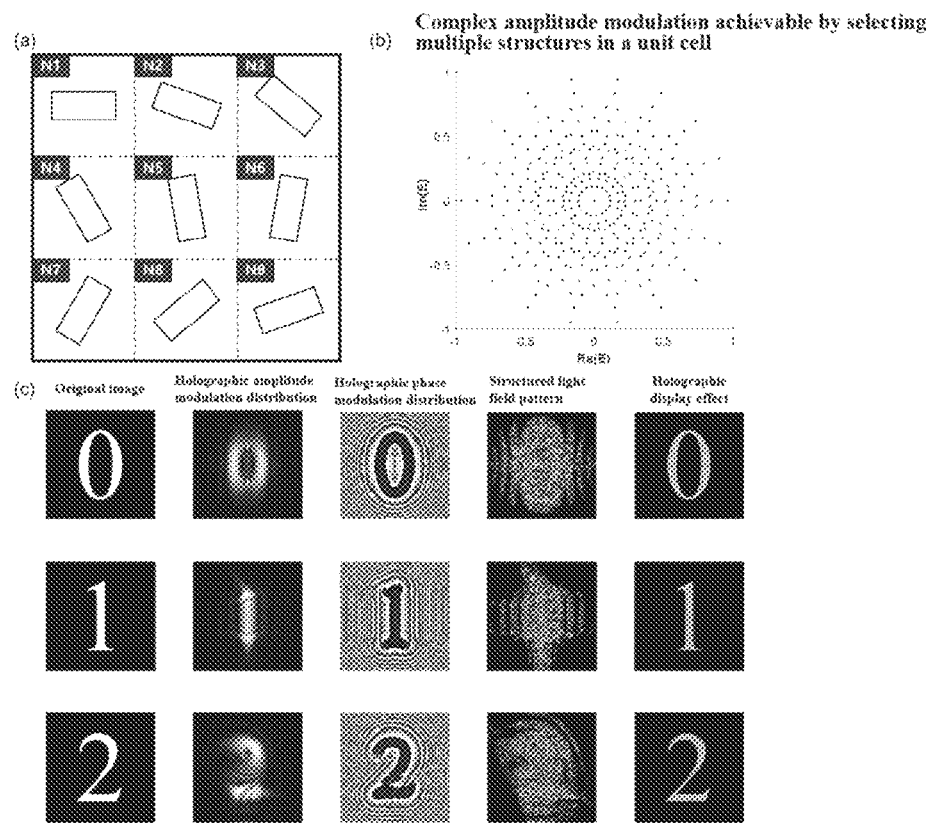

(a), (b), and (c) in FIG. 6 are schematic diagrams provided by one or more embodiments of the present disclosure, illustrating, respectively, a superpixel unit cell composed of 9 anisotropic nano-brick structures that can achieve complex amplitude modulation, a schematic diagram of the real and imaginary parts of the complex amplitude response that can be achieved by simultaneously selecting multiple micro-nano structures using the unit cell, and a simulation result graph of a dynamic optical addressing pixelated complex amplitude holographic display implemented by a superpixel metasurface composed of the unit cell.

Figure 7:
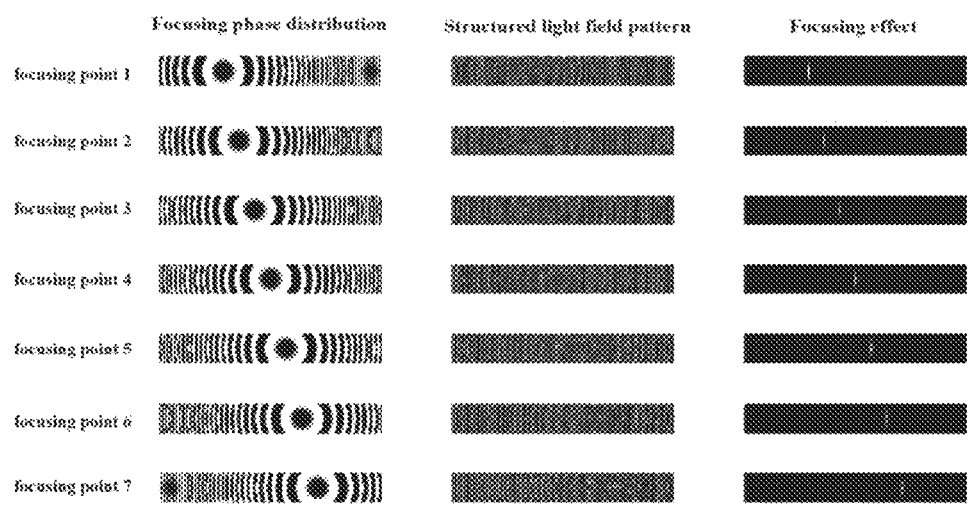

FIG. 7 is a diagram showing the simulation results of a dynamic pure phase holographic display implemented by an optically addressed pixelated spatial light modulator according to one or more embodiments of the present disclosure.

DETAILED DESCRIPTION OF THE EMBODIMENTS

In order to make the objectives, technical solutions, and advantages of the present disclosure clearer, the following gives a more detailed description of the present disclosure in conjunction with the accompanying drawings and embodiments. It should be understood that the specific embodiments described here are only intended to explain the present disclosure and are not intended to limit it. Furthermore, the technical features involved in the various embodiments of the present disclosure described below can be combined with each other as long as they do not conflict.

The singular forms "a/an" and "the" as used in the specification, unless clearly indicated, all contain the plural forms. The words "comprising", "containing" and "including" used in the specification indicate the presence of the claimed features, but do not preclude the presence of one or more additional features. The wording "and/or" as used in the specification includes any and all combinations of one or more of the items listed.

Some embodiments of the present disclosure provide a superpixel metasurface device, which includes a plurality of unit cell structures, with each unit cell structure serving as a light field modulation pixel point, and a plurality of unit cell structures form a light field modulation pixel array.

Each unit cell structure includes a plurality of sub-wavelength micro-nano structures, and the unit cell structure generates a light field modulation amount under the action of the structured light beam for light field modulation.

The light field modulation includes phase modulation and/or amplitude modulation.

In some embodiments, the sub-wavelength micro-nano structures are isotropic structures or anisotropic structures.

In some embodiments, the shapes of all unit cell structures are identical and are polygonal.

Specifically, the metasurface device consists of unit cell pixels composed of a plurality of micro-nano structures. At each pixel location, the micro-nano structures tiled within the unit cell can achieve different light field modulations.

Figure 1:
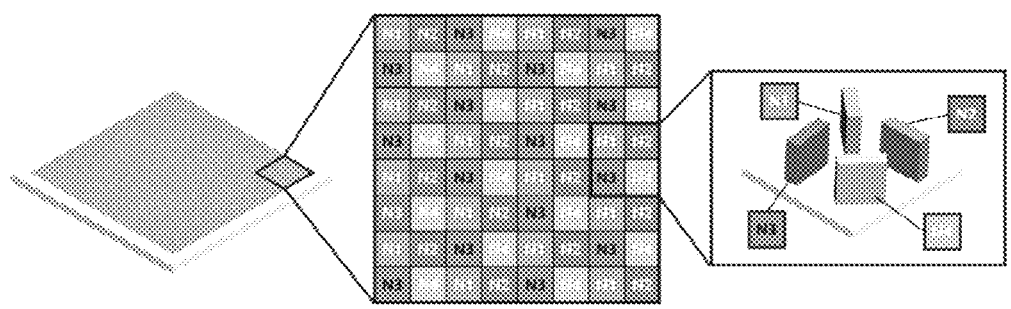
FIG. 1 is a schematic structural diagram of a superpixel metasurface device according to one or more embodiments of the present disclosure.

As shown in FIG. 1, the superpixel metasurface device is composed of repeating unit cell structures. A plurality of sub-wavelength micro-nano structures with different morphological structures are arranged within the unit cell structure, which can achieve multi-order light field modulation, such as phase modulation, amplitude modulation, etc.

The processing of the superpixel metasurface device can employ methods such as focused plasma beam etching, electron beam exposure, photolithography, or laser processing.

The sub-wavelength micro-nano structures can be isotropic structures (such as cylinders or circular holes, etc.), anisotropic structures (such as matrix holes, matrix rods, elliptical holes, elliptical rods, etc.), symmetric structures, or free-shaped structures. The structures can be designed by electromagnetic field simulation software using methods like parameter scanning, topology optimization algorithms, machine learning optimization algorithms, or neural network algorithms, or they can be obtained by testing and optimization in actual experiments. The materials that constitute the sub-wavelength structures can be dielectric materials (such as silicon, silicon nitride, titanium dioxide, etc.), as well as metallic or semiconductor materials (such as gold, silver, aluminum, gallium nitride, etc.), and may also include nonlinear materials.

To ensure a dense arrangement between the unit cells, the unit cell structures can have shapes such as rectangles or hexagons. The spacing between the micro-nano structures within the unit cells should be sufficiently large to ensure that mutual electromagnetic coupling can be ignored.

The superpixel metasurface device provided by the embodiments of the present disclosure can achieve high-precision light field modulation with the help of the small structural dimensions of the cellular unit and the excellent light field modulation capability. By leveraging the device design concept of supercell and integrating structured light field projection, arbitrary pixelated light field modulation can be realized. Furthermore, by simultaneously illuminating multiple substructures and employing a multiplex design for the substructures, the modulation capability of the device can be enhanced, enabling functions such as complex amplitude modulation, which offers significant potential for optimization and functional exploration.

Figure 2:
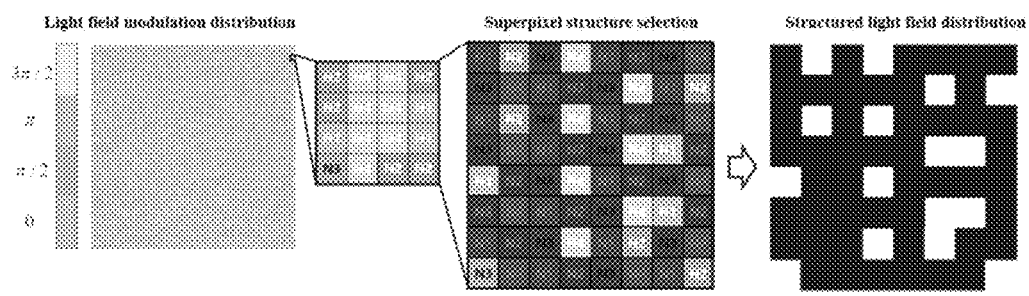
FIG. 2 is a schematic diagram of an optical path of an optically addressed pixelated spatial light modulator according to one or more embodiments of the present disclosure.
Figure 3:
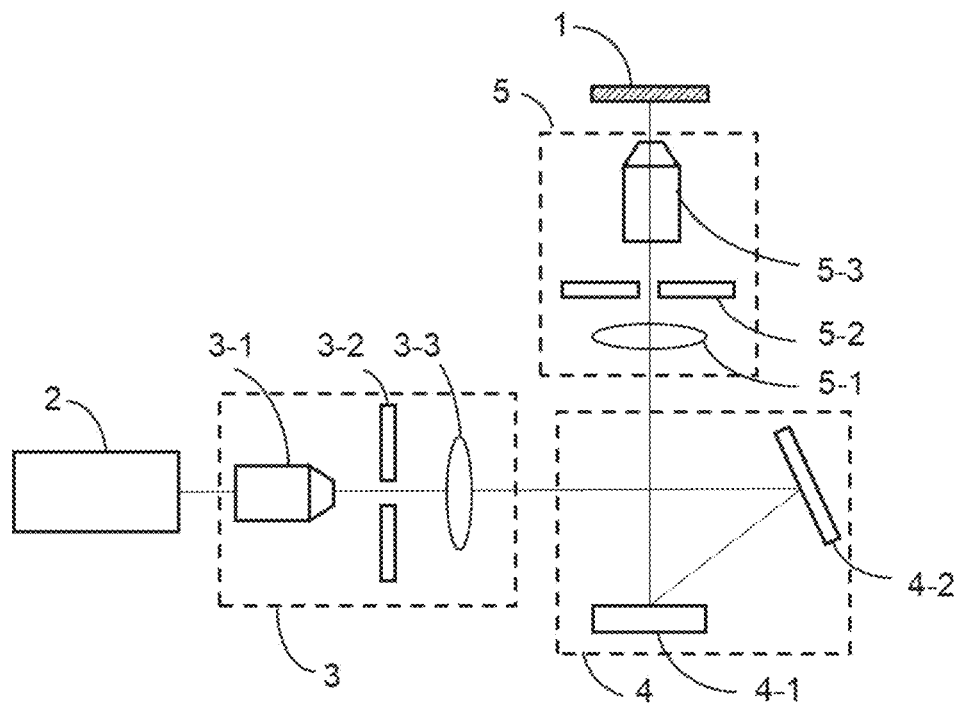
FIG. 3 is a schematic diagram of a structured light field distribution generation process according to one or more embodiments of the present disclosure.

Some embodiments of the present disclosure provide an optically addressable pixelated spatial light modulator, as shown in FIG. 2, including a laser light source 2, a structured light field encoding projection module, and a superpixel metasurface device 1 as described in any of the above embodiments.

The structured light field encoding projection module includes a structured light field encoding module 4, which encodes the laser beam emitted by the laser light source into a structured light beam according to the modulation amount distribution of a target light field.

The structured light beam is incident on the superpixel metasurface device 1, selecting the micro-nano structures in the unit cell corresponding to the modulation amount distribution to achieve the target light field modulation.

In an exemplary embodiment, the structured light field encoding projection module further includes:

A beam expansion module 3, positioned between the laser light source and the structured light field encoding module, is configured to expand the laser beam.

A beam contraction module 5, positioned between the structured light field encoding module and the superpixel metasurface device, is configured to contract the structured light beam.

Furthermore, additional modules, such as polarization-related modules or filtering modules, can be incorporated into the aforementioned device according to the operational conditions of the metasurface.

In an exemplary embodiment, the laser light source is used to generate a laser beam that enters the structured light field encoding projection module. The beam expansion module 3, the structured light field encoding module 4, and the beam contraction module 5 together form a high-speed structured light field encoding projection module that encodes the laser beam emitted by the laser light source into the structured light beam to illuminate the superpixel metasurface 1. The structured light beam selects one or more structures in each unit cell that modulate the incident light at that unit cell pixel position to achieve the desired light field modulation effect. When multiple micro-nano structures are selected within a unit cell, the resulting light field modulation amount follows the principle of vector superposition.

The structured light field encoding projection module is configured to generate a structured light field distribution for optical addressing. The included structured light field encoding module is used to rapidly generate structured light beams and select the substructures (i.e., micro-nano structures) in the unit cell pixels that produce light field modulation effects.

The high-speed structured light field encoding projection module provided by the embodiment of the present disclosure can achieve high-speed dynamic structured light beam encoding projection, i.e., high-speed dynamic light field modulation. The innovative "optical addressing" method avoids complex device circuit designs, reduces the requirements for manufacturing materials, and features an ultra-high refresh rate, which is expected to be applicable in beam scanning and dynamic holographic display fields.

When applied to the optical band, the core light field encoding device of the structured light field encoding module 4 is a Digital Micromirror Device (DMD) 4-1. The DMD includes approximately 1920×1080 micro mirrors with a size of about 7.6 μm and a processing module. Each micromirror is capable of independently deflecting the incident light to affect the on-off of the light and thus each micromirror is capable of independently encoding the incident light in a 0/1 switching mode. The processing module determines the selection information of the unit cell structures within the superpixel metasurface based on the light field modulation distribution, and encodes the incoming laser into a structured light beam through the micro-mirrors according to this information. The encoding speed of the DMD for the incident light depends on the deflection speed of the micro-mirrors, thus achieving a coding rate of 9523 Hz/s. The mirror 4-2 is used to fold and adjust the direction of the incident light to the DMD device and the metasurface, ensuring that the DMD modulation surface remains parallel to the superpixel metasurface, and that the structured light beam encoded by the DMD is properly incident on the superpixel metasurface.

The beam expansion module and beam contraction module both include a 4F system composed of lenses and objective lenses, which is used to adjust the size of the light field and convert the structured light beam into a higher-precision structured light beam.

In an exemplary embodiment, the beam expansion module is a filter beam expansion module. The filter beam expansion module 3 includes a microscope objective 3-1, a filter aperture 3-2, and a lens 3-3, which is used to filter out higher-order diffracted light from the emitted laser light source 2 while expanding the beam to match the size of the DMD control surface. The magnification of the beam is $$M = \frac{f_{lens(rear)}}{f_{microscope\ objective(front)}}.$$

The beam contraction module 5 includes a lens 5-1, a filter aperture 5-2, and a microscope objective 5-3. The beam contraction module 5 contracts the structured light beam generated by the DMD into a high-precision structured light beam, allowing for the accurate selection of one or more micro-nano structures in each unit cell of the superpixel metasurface, thereby modifying the light field modulation effect. The beam reduction ratio is $$M = \frac{f_{microscope\ objective(rear)}}{f_{lens(front)}}.$$

The optically addressable pixelated spatial light modulator provided by the present disclosure designs superpixel metasurface devices according to the modulation methods. It calculates the spatial distribution of the light field modulation and encodes it into a structured light field distribution. Utilizing the structured light field encoding projection module; generates a corresponding structural light beam to act on the superpixel metasurface device using a structural light field encoding projection module, thereby achieving the target light field modulation. This allows for high-precision, high-speed pixelated complex light field modulation.

Some embodiments of the present disclosure provide a spatial light field modulation method, employing an optically addressable pixelated spatial light modulator as described in any of the above embodiments, including:

Determining the modulation amount distribution required for the target light field modulation;

Encoding the laser beam based on the modulation amount distribution to obtain a corresponding structured light beam;

Directing the corresponding structured light beam into the superpixel metasurface device, where the unit cell structure corresponding to the modulation amount distribution generates a light field modulation amount to achieve the target light field modulation.

In an exemplary embodiment, first, according to the transmittance function of common devices (optical elements used for light field modulation) or using optimization algorithms such as the Gerchberg-Saxton (GS) iteration, calculate the light field modulation distribution to be achieved by the superpixel metasurface device.

Then, convert this modulation distribution into selection information for the micro-nano structures in the unit cell, allowing for the selection of one or more micro-nano structures.

Finally, based on the selection information of the substructures (i.e., micro-nano structures), further generate the structured light field distribution to achieve spatial light field modulation.

Figure 4:
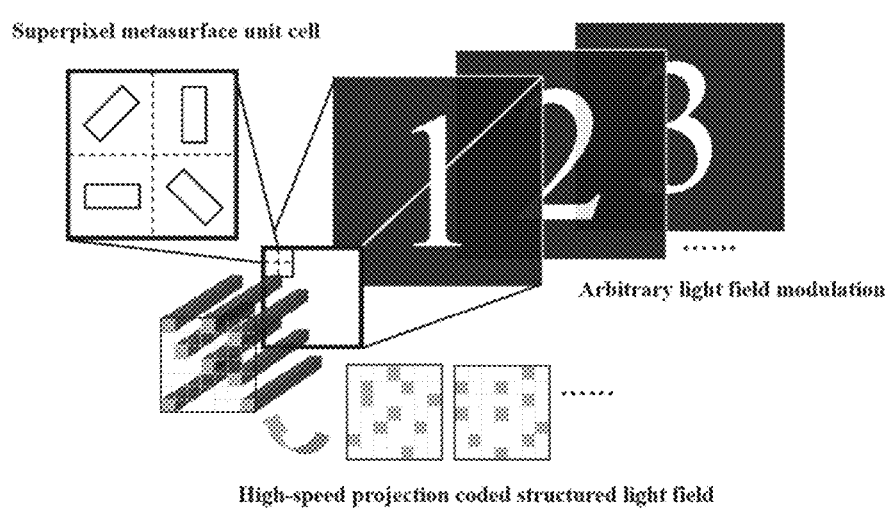
FIG. 4 is a schematic diagram of an optically addressed pixelated spatial light modulator according to one or more embodiments of the present disclosure.

As shown in FIG. 4, the present disclosure provides a schematic diagram of the optically addressable pixelated spatial light modulator. It generates a structured light beam through the high-speed structured light field encoding projection module to select one or more structures in a unit cell, thus achieving any target light field modulation.

Some embodiments of the present disclosure provide a dynamic holographic video display method, employing an optically addressable pixelated spatial light modulator as described in any of the above embodiments, including:

Determining the phase modulation amount distribution for each frame image of a holographic video to be displayed;

Encoding the laser beam based on the phase modulation amount distribution of each frame image to obtain a corresponding structured light beam;

Directing the corresponding structured light beam into the superpixel metasurface device, selecting the micro-nano structures in the unit cell that correspond to the phase modulation amount distribution distribution to display each frame image.

Figure 5:
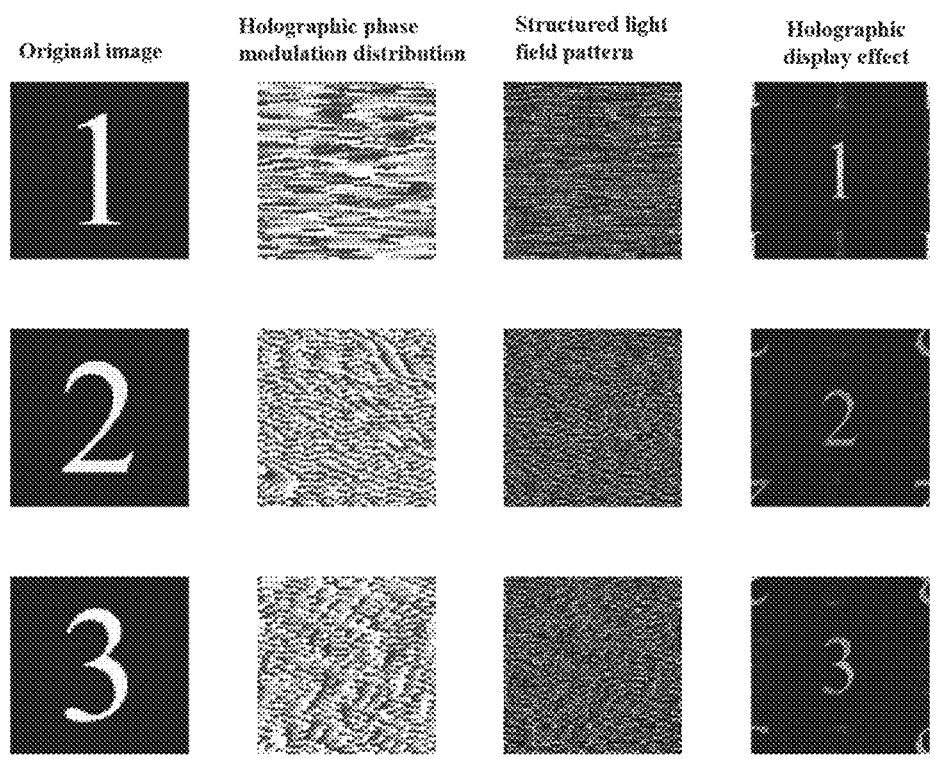
FIG. 5 is a diagram showing a simulation result of a focal point scanning implemented by an optically addressed pixelated spatial light modulator according to one or more embodiments of the present disclosure.

Holographic displays are expected to achieve glasses-free 3D viewing, making them a research hotspot in the fields of display, processing, and optical manipulation. As shown in FIG. 5, based on an optically addressable pixelated spatial light modulator and a spatial light field modulation method provided by the present disclosure, a suitable structure in each cell is selected and a structural light field pattern is generated based on a purely phase-computed hologram obtained by optimization of the GS algorithm. By switching the structured light field patterns loaded onto the DMD, holographic pattern switching can be achieved. Due to the high frame rate characteristics of the projection system, this holographic display system can achieve high-speed, smooth holographic video display.

As shown in FIG. 1, four micro-nano structures with orientation angles differing by 45° are combined to form a unit cell structure. According to the principle of geometric phase modulation, the fourth-order geometric phase modulation amounts $\phi_n$ provided by these four anisotropic nano-brick structures are $$0, \frac{\pi}{2}, \pi, \frac{3\pi}{2},$$

where n=1 to 4. This unit cell structure is then repeated to create a supercell metasurface template for "optical addressing" ready to select the modulation amount to be achieved by the unit cell pixel when the structured light beam is incident. High-speed and smooth holographic video display is achieved by switching holographic patterns.

Some embodiments of the present disclosure provide a dynamic complex amplitude holographic video display method, employing an optically addressable pixelated spatial light modulator as described in any of the above embodiments, including:

Determining the complex amplitude modulation amount distribution for each frame image of a complex amplitude holographic video to be displayed;

Encoding the laser beam based on the complex amplitude modulation amount distribution of each frame image to obtain a corresponding structured light beam;

Directing the corresponding structured light beam into the superpixel metasurface device, selecting the micro-nano structures in the unit cell that correspond to the complex amplitude modulation amount distribution to display each frame image.

Specifically, the complex amplitude modulation is achieved by selecting multiple structures in the unit cell.

As shown in (a) of FIG. 6, nine micro-nano structures with orientation angles differing by π/9 are combined to form a unit cell structure. According to the principle of geometric phase modulation, the ninth-order geometric phase modulation amounts $\phi_n$ provided by these nine anisotropic nano-brick structures are $$0, \frac{2\pi}{9}, \frac{4\pi}{9}, \frac{2\pi}{3}, \frac{8\pi}{9}, \frac{10\pi}{9}, \frac{4\pi}{3}, \frac{14\pi}{9}, \frac{16\pi}{9},$$

where n=1 to 9. This unit cell structure is then repeated to create a supercell metasurface template for "optical addressing" ready to select the modulation amount to be achieved by the unit cell pixel when the structured light beam is incident.

According to the principle of vector superposition, the light field modulation amount that a single unit cell pixel can generate through the combination of micro-nano structures can be represented as $$\sum_{n=1}^{9} f_n e^{i\phi_n},$$

where $f_n$ is either 0 or 1, indicating whether the nano-brick structure in the unit cell is unselected or selected. In this case, the number of non-repeating complex amplitude modulations that a single unit cell can achieve is 343, forming a database of the relationship between the light field distribution illuminating the unit cells and the complex amplitude modulation amounts. In the real and imaginary part coordinates of complex amplitude modulation, the achievable modulation range is shown in (b) in FIG. 6.

The complex amplitude distribution of the holographic surface to be displayed is calculated by a single Fourier transform. For the value of the complex amplitude at each pixel point, the modulation amount and light field distribution from the database that have the smallest difference from the complex amplitude value are selected as the structural light field distribution at that pixel. Each pixel is traversed, and the structured light field distribution at each pixel point is calculated and the final structured light field pattern is composed. By switching the structured light field patterns loaded onto the DMD, the switching of the complex amplitude holographic display patterns can be achieved, as shown in (c) of FIG. 6.

The complex amplitude holography based on this projection system and display scheme not only has the characteristics of high frame rates and single-pixel control inherent in pure-phase computational holography but also optimizes the quality of the reconstructed images, demonstrating a stronger ability for light field modulation in this spatial light field modulation scheme.

Some embodiments of the present disclosure provide a continuous focus scanning method, employing an optically addressable pixelated spatial light modulator as described in any of the above embodiments, including:

Determining the required distribution of phase modulation amounts for the points to be focused;

Encoding the laser beam according to the phase modulation distribution of each focusing point to obtain the corresponding structured light beam;

Directing the corresponding structured light beam into the superpixel metasurface device, selecting the micro-nano structures in the unit cell that correspond to the required phase modulation distribution for each focusing point to achieve the focusing effect.

Continuous scanning of arbitrary points is crucial for applications such as lidar and particle manipulation. To focus the incident light at different spatial points $(x_0, y_0, z_0)$, the additional phase amount applied at each pixel position $(x, y, 0)$ by the light field modulator is:

$$\varphi_{focus} = \frac{2\pi}{\lambda} \sqrt{(x - x_n)^2 + (y - y_n)^2 + z_n^2}.$$

As shown in FIG. 7, based on the optically addressable pixelated spatial light modulator and the spatial light field modulation method provided by the present disclosure, continuous focusing scanning in the x direction can be achieved when a sequence of structured light field distributions containing focusing field information is sequentially illuminated on the superpixel metasurface device.

The above embodiments are only intended to illustrate the technical solutions of the present disclosure, rather than limit the scope of the disclosure. Obviously, the described embodiments are only some embodiments of the present disclosure, not all embodiments. Any modifications, equivalent substitutions and improvements, etc., made within the spirit and principles of the present disclosure, All should be included in the protection scope of the present disclosure. Although the above embodiments provide a detailed description of the present disclosure, those skilled in the art can still, without conflicting, combine, add, or make other adjustments to the features of the embodiments of the present disclosure according to the circumstances, without exercising inventive labor, in order to obtain different technical solutions that are not depart from the essence of the present disclosure. These technical solutions also fall within the scope of protection of the present disclosure.

What is claimed is:

1. An optically addressable pixelated spatial light modulator, comprising:
    a laser light source, a structured light field encoding projection module, and a superpixel metasurface device;
    wherein the structured light field encoding projection module comprises a structured light field encoding module, and the structured light field encoding module is configured to encode a laser beam emitted by the laser light source into a structured light beam according to a modulation amount distribution of a target light field;
    the superpixel metasurface device comprises a plurality of unit cell structures, each unit cell structure serving as a light field modulation pixel point; each unit cell structure comprises a plurality of sub-wavelength micro-nano structures, and the unit cell structure is configured to generate a light field modulation amount under an action of the structured light beam for a light field modulation; the light field modulation comprises phase modulation and/or amplitude modulation; the sub-wavelength micro-nano structures are isotropic structures or anisotropic structures;
    wherein the sub-wavelength micro-nano structures having different morphological structures are arranged within each unit cell structure; the sub-wavelength micro-nano structures tiled within the unit cell structure are configured to achieve different light field modulations at each pixel location;
    wherein the structured light field encoding module is configured to determine selection information for the unit cell structures based on the modulation amount distribution of the target light field, and to encode the laser beam into the structured light beam according to the selection information;
    the structured light beam is incident on the superpixel metasurface device, selecting one or more sub-wavelength micro-nano structures in the unit cell structure corresponding to the modulation amount distribution to achieve the target light field modulation;
    and wherein:
    (i) each unit cell structure comprises four sub-wavelength micro-nano structures individually providing fourth-order phase modulation amounts $\phi_n$, wherein the fourth-order phase modulation amounts $\phi n$ are 0, $\pi/2$, $\pi$, $3\pi/2$, respectively, where n=1 to 4; or (ii) each unit cell structure comprises nine sub-wavelength micro-nano structures individually providing ninth-order phase modulation amounts $\phi_n$, wherein the ninth-order phase modulation amounts $\phi n$ are 0, $2\pi/9$, $4\pi/9$, $2\pi/3$, $8\pi/9$, $10\pi/9$, $4\pi/3$, $14\pi/9$, $16\pi/9$, respectively, where n=1 to 9; a light field modulation amount generated by a single unit cell structure through combination of sub-wavelength micro-nano structures is represented as $$\sum_{n=1}^{9} f_n e^{i\phi_n},$$

$f_n e^{i\phi_n}$, where $f_n$ is 0 or 1, indicating whether a corresponding sub-wavelength micro-nano structure within the unit cell structure is unselected or selected.

2. The optically addressable pixelated spatial light modulator of claim 1, wherein shapes of all unit cell structures are identical and are polygonal.

3. The optically addressable pixelated spatial light modulator of claim 1, wherein the structured light field encoding projection module further comprises:
    a beam expansion module, positioned between the laser light source and the structured light field encoding module, is configured to expand the laser beam;
    a beam contraction module, positioned between the structured light field encoding module and the superpixel metasurface device, is configured to contract the structured light beam.

4. A spatial light field modulation method, employing the optically addressable pixelated spatial light modulator of claim 1, comprising:
    determining a modulation amount distribution required for the target light field modulation;
    encoding the laser beam based on the modulation amount distribution to obtain a corresponding structured light beam;
    directing the corresponding structured light beam into the superpixel metasurface device, selecting the sub-wavelength micro-nano structures in the unit cell structure that correspond to the modulation amount distribution to achieve the target light field modulation.

5. A dynamic holographic video display method, employing the optically addressable pixelated spatial light modulator of claim 1, comprising:
    determining a phase modulation amount distribution or a complex amplitude modulation amount distribution for each frame image of a holographic video to be displayed;
    encoding the laser beam based on the phase modulation amount distribution or the complex amplitude modulation amount distribution of each frame image to obtain a corresponding structured light beam;
    directing the corresponding structured light beam into the superpixel metasurface device, selecting the sub-wavelength micro-nano structures in the unit cell structure that correspond to the phase modulation amount distribution or the complex amplitude modulation amount distribution to display each frame image.

* * * * *